United States Patent Office 3,290,997
Patented Dec. 13, 1966

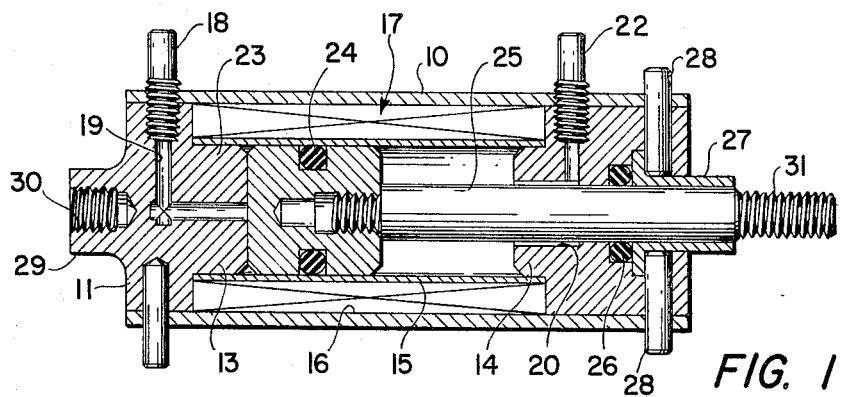
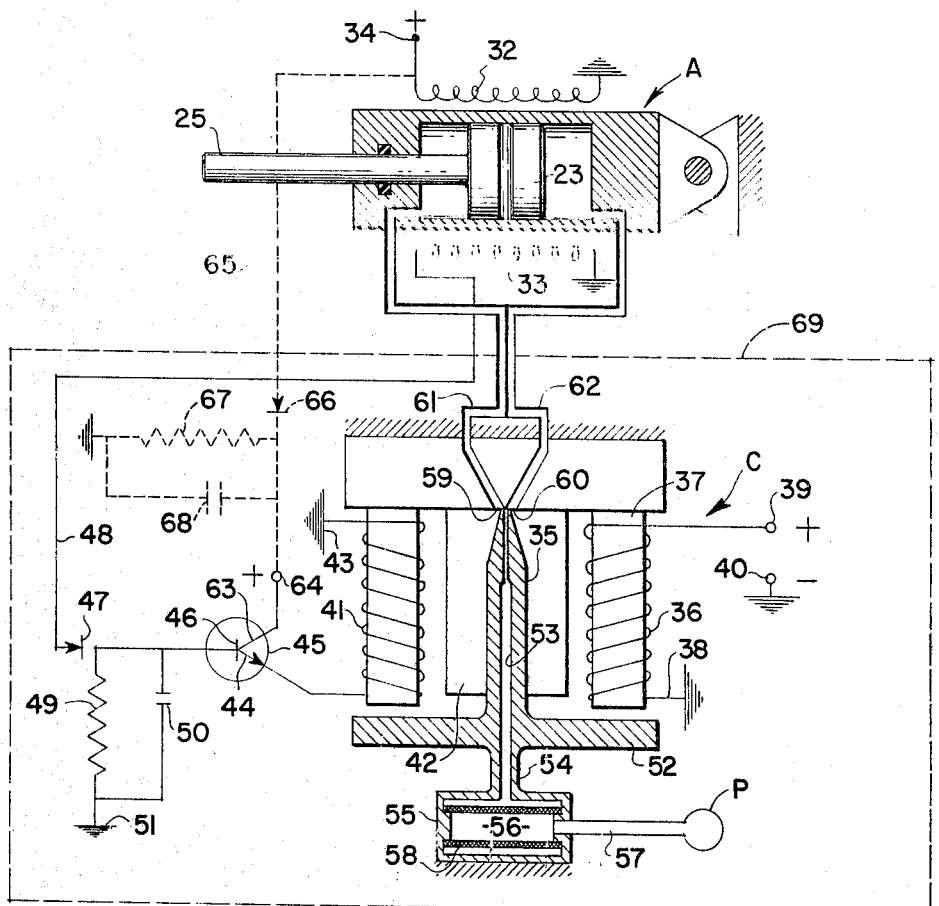

3,290,997
LOW PRESSURE PNEUMATIC PROPORTIONAL CONTROL SYSTEM
Elwood L. Jerome, Manhattan Beach, and Gene C. Burns, Palos Verdes Peninsula, Calif., assignors to Pneumo Dynamics Corporation, Cleveland, Ohio, a corporation of Delaware
Filed Sept. 24, 1964, Ser. No. 398,904
10 Claims. (Cl. 91—3)

This invention relates as indicated to a system for utilizing low pressure air to provide a mechanical output proportional to a control signal input.

It is a primary object of the present improvements to provide such a system in which an extremely compact actuator device is provided and made operable as above recited in an efficient manner and with realization of the maximum output force available in the system.

There are many applications of servo systems in which the weight and/or size of the components are important if not critical factors in the system arrangement, and it is another object of this invention to provide a system wherein the output unit is not only compact but conveniently separable from the control input section. This further consideration thus frees to an even greater degree the load support and space needed for the actuator device, for example, permitting the latter to be incorporated in a relatively lightweight frame or structure and the input control section located on an entirely independent support adequate for the purpose. In noting at the outset the compactness of the actuator device, it is further contemplated that the same will be of such unique construction as to avoid excessive weight as well as size of such component.

The system of the invention includes a feedback which is responsive to the direction of the actuator to compensate by balancing the original control signal input at the displaced condition of the actuator produced by the latter. It is preferred, and an object of the invention, that this feedback be accomplished by electrical means and opposed to an electrical input signal.

A further object is to provide an actuator in such a control system, including an electrical feedback feature, in which the electrical impulse or signal responsive to movement of the actuator is developed in an improved manner, especially in respect of the noted considerations of space and weight of such unit so that the feedback signal generation is accomplished without significantly burdening the unit in these respects.

It is an additional object of the invention to provide such a system utilizing mechanically simple components which can be acquired or produced at low cost.

It is another object of the present improvements to provide a low pressure pneumatic proportional control system having an electrical feedback feature and organized basically into two separate units or assemblies, viz., actuator and control sections, which require interconnection only by small pnuematic lines and electric wires.

It is yet another object of the invention to provide a mechanical actuator in the basic form of a cylinder and piston wherein these two parts are uniquely adapted to furnish, within substantially their usual confines, an electrical signal in association with an external circuit which will be proportional to movement of the piston within the cylinder, this being the source of the electrical feedback in the preferred embodiment of the system invention.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an illustration of a pneumatic actuator in accordance with the present invention, the view being a longitudinal section thereof; and FIG. 2 is a schematic diagram of the complete system, including the FIG. 1 actuator.

Referring now to the drawings in detail, the actuator fully shown in FIG. 1 comprises an outer tube 10, a gland 11 fitted in and closing one end of this outer tube, and a further gland 12 closing the other end. The glands 11 and 12 have reduced diameter inner extensions 13 and 14, respectively, and an inner tube 15 is disposed within the assembly with its ends fitted about and supported by the extensions 13 and 14.

There is accordingly an annular space 16 within this hollow cylinder assembly between the inner and outer tubes and, for a purpose to be later described, a pair of electrical coils, insulated from each other and wound in corresponding hollow cylindrical form is disposed in this annular space, with such dual coil assembly being generally designated by reference numeral 17. It is preferred that the tubes thus forming the hollow wall cylinder be made of stainless steel, with the outer wall being somewhat heavier because of its obvious load supporting function in the assembly, and the end glands would normally be made of plastic to minimize magnetic circuit loss as will be better appreciated hereinbelow.

A porting tube 18 is positioned to pass radially through the outer tube 17 into the end gland 11 to provide communication through a connecting passageway 19 provided in the gland and extending radially as a continuation of the porting tube 18 and then at right angles along the axis to the inner end of the reduced extension 13 of such gland or, in other words, to one end of the interior or chamber within the cylinder formed by the tube and gland assembly. The opposite end gland 12 has an axial bore 20 in its extension 14 and a radial passage 21 extending from the inner end of the bore 20 to a further porting tube 22, whereby there is a further external communication at the other end of the cylinder assembly.

Disposed for movement in sealed relation within the cylinder assembly is a piston 23 fabricated from a magnetic material, again for a purpose to be later explained. This piston is sealed to the inner tube at its periphery by a resilient rubber ring 24 and a piston rod 25 extends from the piston at that side opposed to the end gland 12 axially through the relatively enlarged bore 20 of the gland extension 14 and through a reduced axial continuation of the bore provided for extension of the rod outwardly of this end of the cylinder assembly. The piston rod is sealed at its continuation beyond the bore 20 within the gland 12 by an encircling resilient sealing ring 26 and it is centered by being supported in sleeve bearing 27 just outward of the seal 26. The bearing 27 has an inner end flange, and it is held in place by means of pins 28 extending radially through the outer tube 10 and end portion of the gland 12, with the inner end portions of these pins overlying the outer face of the bearing flange as shown.

The gland 11 has a reduced outer axial extension 29 in which there is a tapped hole 30, while the extreme outer end of the piston rod is externally threaded at 31. These features accommodate mounting of the assembly at the gland 11 and threaded connection of the piston rod to an external link or other mechanism to be actuated by movement of the piston. As shown, the porting tubes at the ends of the cylinder assembly have threaded engagements therein.

With regard now to the full system of the invention, utilizing the previously described actuator, and referring to the diagram of FIG. 2, a simplified form of this actuator is shown and designated generally by the reference letter A. The coil assembly 17 noted above as comprising two relatively insulated windings accommodated between the inner and outer walls of the cylinder assembly is here shown as comprising a primary winding 32 and a secondary winding 33, with one end of each coil considered to be at an electrical ground potential as symbolized. The magnetic piston 23 thus serves as a core for such winding with all three such elements effectively comprising an electrical transformer having the piston as a core member. A fixed voltage is applied to the primary winding 32 at the end 34 thereof and it will be obvious that the piston-core influences the coupling between the primary 32 and secondary 33. It will, moreover, be appreciated that since the piston-core is of less length than the winding assembly the coupling of the windings will vary with changes in the position of the piston. Accordingly, there is induced in the secondary winding an electrical signal the magnitude of which is varied by movement of the piston 23. The piston movement is determined by differences in air pressure at its respective sides and the distribution of air under pressure between the ends of the cylinder assembly is controlled by movement of a jet pipe 35 within an electrical torque motor designated generally by reference letter C.

This torque motor and jet pipe unit, serving as the control section of the system, comprises a first coil 36 wound about one leg of a magnetic yoke or core structure 37. The winding 36 is shown as being grounded at one end 38, with a control input signal applied across the terminals 39 and 40 respectively connected to the other end of the winding 36 and to ground. A second motor coil 41 is wound about an opposed leg of the magnetic yoke 37, which includes an intermediate core piece 42 for better coupling, with one end of this coil 41 also being shown grounded at 43. The other end of the winding 41 is connected to the emitter 44 of the transistor 45, and the base 46 of this transistor is connected through a diode rectifier 47 and wire 48 to the ungrounded end of the secondary transformer winding 33. This connection includes a filtering network between the rectifier and transistor base comprising a resistor 49 and capacitor 50 connected between the base and a ground 51 in parallel as shown. The torque motor C includes an armature 52 in which the previously noted jet pipe 35 is incorporated. Such jet pipe is of course hollow and the axial passage 53 thereof leads from the armature through a flexible connecting section 54 to a stationary housing 55 defining a chamber 56 with which the passage 53 communicates. An air line 57 leads from the center of the chamber 56 to a suitable source P of air under pressure, and a filter 58 is interposed between that part of the chamber 56 receiving the air from such source and the peripheral portion of the chamber in communication with the jet pipe passage 53.

The reduced discharge end of the jet pipe 35 is opposed to two adjoining ports 59 and 60, with the port 59 communicating through an air line 61 to one end of the cylinder of the actuator A and the port 60 supplying air through another such line 62 to the opposite end of the cylinder, these being the respective end ports previously described in the more complete mechanical construction of the actuator in FIG. 1.

The pneumatic pressure thus introduced directly from the source P to the jet pipe 35 would ordinarily be at a pressure within the range of about 80 to 100 p.s.i. The flexible section 54 from the housing 56 to the motor armature exerts a spring influence effective normally to provide centering of the jet pipe. As previously mentioned, there is an electrical control signal applied to the input terminals 39 and 40 of the control section which includes this torque motor and the transistor circuit, with this command signal appearing across the coil 36 and of course creating an unbalanced condition which causes the jet pipe-armature to be angularly displaced from the normal centered position. Such displacement creates the unbalance of pressures at the respective sides of the piston 23 within the actuator A by reason of the resulting unequal opposition to the receiver ports 59 and 60 so that the piston is caused to move axially in response to the input signal. The permanent magnet 42 included in the motor polarizes the magnetic circuits and has the effect of increasing the operating force level of the motor.

The primary winding 32 incorporated, in effect, in the cylinder wall of the actuator A is preferably excited with alternating current at about 10 volts and 1000 cycles per second. It will be appreciated that movement of the piston from one end of the cylinder to the other in changing the ratio of the coupling being the primary and secondary windings 32, 33, produces in the latter an electrical signal which is proportional to such displacement of the piston and hence the mechanical device to be moved thereby. This secondary winding signal is fed back to the torque motor through the diode rectifier 47 and the filter circuit comprising the resistor 49 and capacitor 50 to the transistor 45 which serves to amplify the signal. The transistor does require a direct current bias which is shown as applied to its collector 63 at the terminal 64. Such bias can be accomplished in any suitable manner, for example, by the circuit shown in dashed lines as comprising wire 65 from the primary input terminal 34, diode rectifier 66, and the grounded filter comprising resistor 67 and capacitor 68 in parallel. A separate direct current supply could of course also be used for this purpose.

It will now be apparent that the piston is moved proportionally to the magnitude of the input signal applied to winding 36 and the unbalance created thereby in the torque motor. The piston displacement in turn alters the coupling between the primary and secondary windings within the actuator to generate an electrical feedback which is rectified, filtered, amplified and applied to the opposite winding 41 of the torque motor. When this feedback signal reaches the same magnitude as the input signal, the motor is effectively again balanced and the jet pipe is returned to its null position, the differential pressure then being eliminated and movement of the piston stopped.

The system of the invention thus is clearly distinguished by two units, viz., the actuator A and the control section shown enclosed within the dashed line 69, the latter comprising the miniature and hence lightweight electronic amplifying circuit and the torque motor C; full operative connection of the two is realized by simple pneumatic lines and wires. As already explained, this separation of the system into two packages permits them to be quite remote from each other in application of the system to a given installation, and the remote location of the control section has the further advantage of permitting valve noise to be muffled where desired.

The cylinder of the actuator effectively forms a bobbin for winding of the primary and secondary coils of a transformer serving as a linear variable differential transducer for purpose of the described feedback feature, while the piston operates as a magnetic slug for this transducer part of the assembly. It will also be apparent that the control input signal and the follow up signal are mechanically and/or magnetically combined within the torque motor, whereby electrical summation of the two signals is not necessary. The torque motor also acts as a mechanical filter for the alternating current follow up or feedback signal generated and thereby minimizes the rectification requirement of the illustrated circuit. With miniature electrical components used, these can be conveniently mounted on a small printed circuit board located inside the housing for the controller, the major element of which is the torque motor.

Other modes of applying the principle of the invention may be employed, change being made as regards the details described, provided the features stated in any of the following claims or the equivalent of such be employed.

We therefore, particularly point out and distinctly claim as our invention:

1. In a system of the character described, a cylinder assembly, piston means movable within said cylinder and including an externally projecting extension serving as a force output member, control means for variably supplying pressure fluid to the cylinder assembly at the respective sides of the piston means to actuate the latter, electrical windings included in the cylinder assembly in relatively insulated relation, energy means for exciting one of said windings, and another of said windings being in inductively coupled relation to such one winding and connected in a circuit to produce an electrical signal as a result of excitation of the one winding, the piston means being so constructed as to variably influence the coupling of the windings by movement of the piston means within the cylinder assembly.

2. The combination set forth in claim 1 wherein the piston means includes magnetic structure.

3. The combination set forth in claim 1 wherein the cylinder assembly supports the electrical windings in encircling relation to the piston means.

4. The combination set forth in claim 3 wherein said windings are incorporated in the wall of the cylinder assembly and are substantially co-extensive therewith.

5. The combination set forth in claim 4 wherein the piston means includes magnetic structure serving as a core for said windings which partakes of the movement of the piston means.

6. In a system of the character described, electrical control means comprising first and second windings and armature structure movable in response to energization of said windings, the two windings being opposed relative to the armature structure, fluid valve means operated by movement of the armature structure, a cylinder-piston actuator assembly in which the piston is reciprocated by differences in pressure fluid at its respective sides under control of said valve means, the piston being at least in part magnetic, primary and secondary windings in relatively insulated cylindrical form and disposed in the actuator assembly about the piston, means for energizing the primary winding at a predetermined reference value, circuit means interconnecting said secondary winding and one of the first and second windings of the electrical control means, and means for applying a control signal to the other of said first and second windings, the thus applied control signal causing the armature structure to move and operate the valve means to produce proportional movement of the piston, and said piston movement varying the coupling of said primary and secondary windings to produce a feedback signal in the latter which is applied to the other control means winding for opposing the influence of the control signal on the armature structure.

7. The combination set forth in claim 6 wherein the pressure fluid is air, and the valve means includes a jet pipe for delivery of the air to the cylinder.

8. The combination set forth in claim 6 wherein the circuit interconnecting said secondary winding and said other winding of the control means includes transistor means for amplifying the feedback signal.

9. The combination set forth in claim 6 wherein said cylinder-piston actuator assembly and said electrical control means are mechanically separate and connected only by fluid lines and electrical wires.

10. The combination set forth in claim 6 wherein the cylinder is of hollow wall construction, and said primary and secondary windings are disposed therewithin.

References Cited by the Examiner

UNITED STATES PATENTS

| 2,485,094 | 10/1949 | Gundersen | 91—3 X |
| 2,627,183 | 2/1953 | Greenwood | 336—136 X |
| 2,958,137 | 11/1960 | Mueller | 336—136 X |
| 2,987,048 | 6/1961 | Buxton | 91—363 |

FOREIGN PATENTS

| 928,616 | 6/1963 | Great Britain. |

MARTIN P. SCHWADRON, *Primary Examiner.*

FRED E. ENGELTHALER, SAMUEL LEVINE,
*Examiners.*

EDGAR W. GEOGHEGAN, P. T. COBRIN,
*Assistant Examiners.*